United States Patent [19]

Laws et al.

[11] 4,227,922
[45] Oct. 14, 1980

[54] MATERIAL SEPARATION

[75] Inventors: William R. Laws, Worcester Park; Geoffrey R. Reed, Shepperton, both of England

[73] Assignee: Encomech Engineering Services Ltd., Hounslow, England

[21] Appl. No.: 911,224

[22] Filed: May 31, 1978

[30] Foreign Application Priority Data

Jun. 9, 1977 [GB] United Kingdom ............... 24231/77

[51] Int. Cl.² ............................................. C22B 15/00
[52] U.S. Cl. .......................................... 75/64; 75/63; 75/88
[58] Field of Search .......................... 75/63, 64, 85, 88

[56] References Cited

U.S. PATENT DOCUMENTS

| 896,245 | 8/1908 | Reid | 75/63 |
|---|---|---|---|
| 1,189,830 | 7/1916 | Kimball | 75/88 |
| 2,261,406 | 11/1941 | Orme | 75/63 |
| 2,268,484 | 12/1941 | Hill | 75/64 |
| 3,022,161 | 2/1962 | Finkener et al. | 75/64 |
| 3,094,395 | 6/1963 | Richardson | 75/63 |
| 3,512,958 | 5/1970 | Yokozawa et al. | 75/63 |
| 3,595,484 | 7/1971 | Barnard et al. | 75/88 |
| 3,756,804 | 9/1973 | Stevenson | 75/88 |
| 3,762,911 | 10/1973 | Von der Crone et al. | 75/63 |

Primary Examiner—L. Dewayne Rutledge
Assistant Examiner—John P. Sheehan

[57] ABSTRACT

A metal or alloy, present in material containing another metal or alloy having a higher melting point, can be recovered by heating the material in conditions preventing oxidation of the lower melting point metal or alloy, vaporizing this metal or alloy and depositing it on at least one collective surface. The initial heating may be performed in a controlled atmosphere at around atmospheric pressure, e.g. up to the melting point of the lower melting metal or alloy, whereafter the pressure can be reduced and heating continued to effect the vaporization.

Apparatus for use in such a process comprises a heating chamber, means for heating the material in said chamber, means for producing higher and lower pressure conditions in said chamber, and condenser means in said chamber or arranged to be put into communication with the chamber in conjunction with the production of said lower pressure condition for the deposition of vaporized lower melting point metal or alloy on said condenser means.

The invention may be applied to recovery of tin and lead from tin plate scrap, and more generally to recovery of lower melting point metals and alloys, e.g. zinc, lead or copper, from scrap and refuse.

8 Claims, 12 Drawing Figures

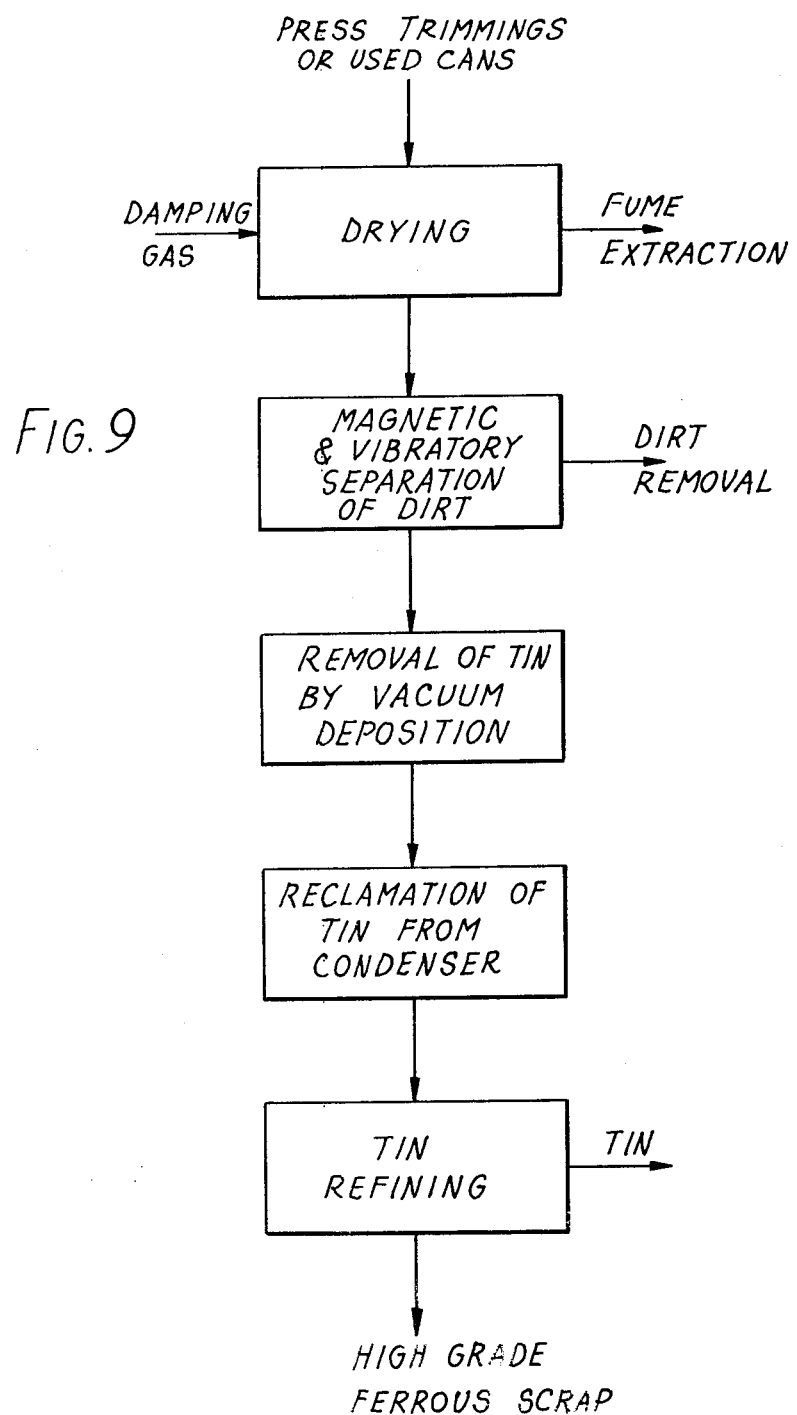

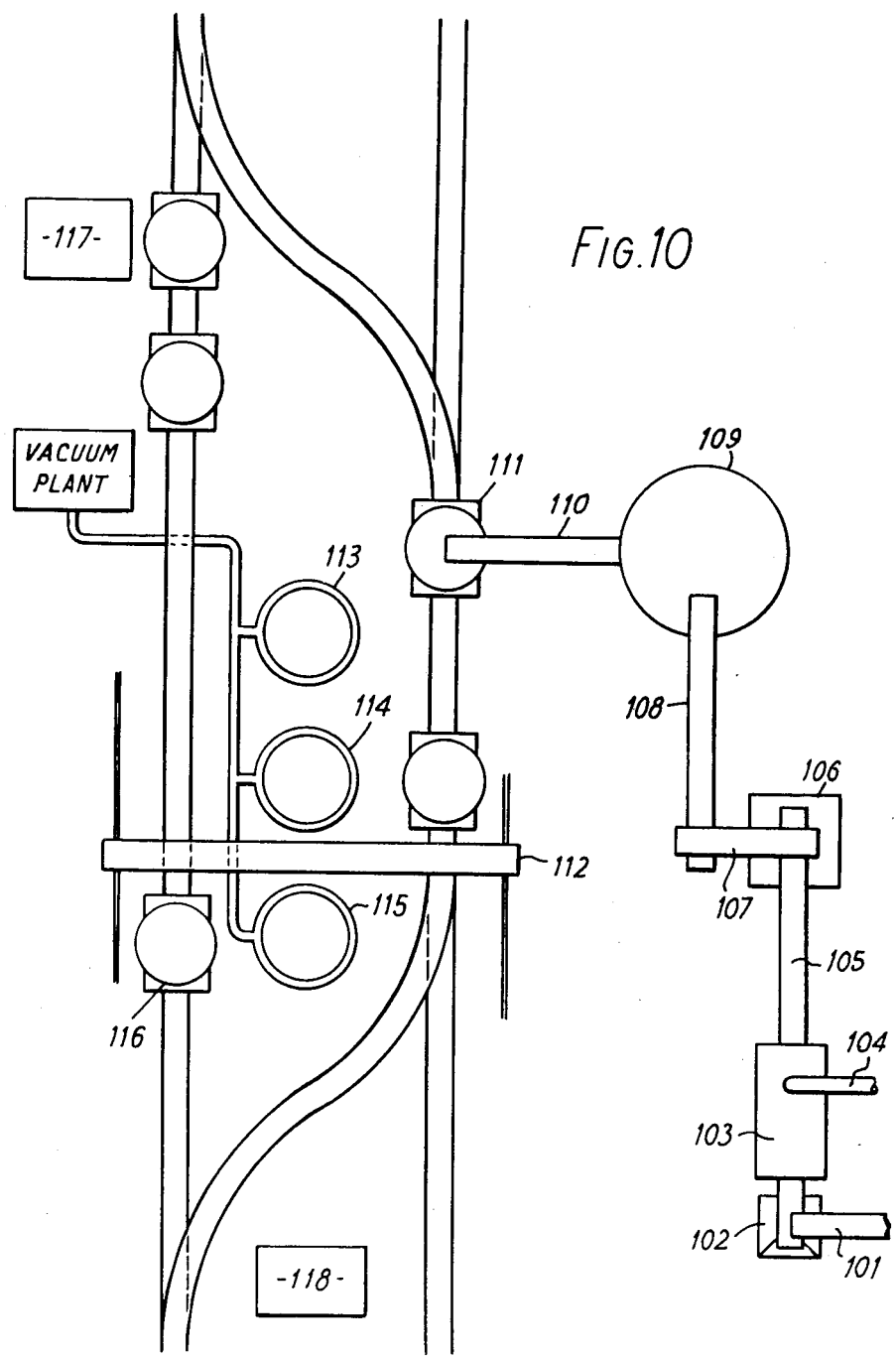

MATERIAL SEPARATION

BACKGROUND OF THE INVENTION

This invention relates to a process and an apparatus for the recovery of a lower melting point metal or alloy from material in which it is present with a higher melting point metal or alloy, e.g. as in the scrap or waste recovery of tin from tin-plated steel or copper from copper-coated steel wire.

Chemical processes for the recovery of tin from tin plate are known, the most commonly used one involving the removal of the tin from tin plate in a solution of sodium hydroxide and reclamation of the tin by electrolysis. This process has been used to recover tin from press trimmings, but increasingly now chemical-resistant lacquers are being used to coat tin plate and this reduces the effectiveness of the process.

Moreover, known chemical processes cannot be used easily on a commercial basis for reclaiming the tin from used tin cans extracted from refuse because:

(a) tin cans have soldered and rolled interlocking seams which restrict the penetration of the de-tinning solution thereby inhibiting tin removal, (b) cans extracted from refuse contain up to 30% by weight of organic and inorganic debris: this debris contaminates and degrades the chemicals used in the de-tinning process, (c) as with press trimmings, the lacquer on the cans is difficult to remove chemically.

SUMMARY OF THE INVENTION

According to one aspect of the present invention, there is provided a process for removing a lower melting point metal or alloy from material to which it is present with a higher melting point metal or alloy, wherein the material is heated in conditions arranged to prevent oxidation of said lower melting point metal or alloy and said lower melting point metal or alloy is vaporised from the material and collected by deposition on a collecting surface or surfaces.

It will often be desirable for the vaporisation to be induced under vacuum or partial vacuum conditions with the initial heating being carried out at a pressure that is atmospheric or close to atmospheric. The heating may be continued to attain a controlled temperature at which said metal or alloy melts after which the pressure is reduced to vaporise the melted material, or the pressure may be reduced before melting of the metal or alloy. Preferably, an initial stage of said heating takes place in a controlled atmosphere, the material then being subjected to a reduction of ambient pressure followed by an increase of temperature to well above the melting point of said lower melting point metal or alloy to effect its vaporisation.

In another aspect, the invention provides for use in such a process, apparatus comprising a heating chamber, means for heating the material in said chamber, means for producing higher and lower pressure conditions in said chamber, and condenser means in said chamber or arranged to be put into communication with the chamber in conjunction with the production of said lower pressure condition for the deposition of vaporised lower melting point metal or alloy on said condenser means.

The material may be heated by a number of different methods, e.g. electric induction, coreless induction or hot gas circulation. This last may be preferred when the heating is carried out under the higher pressure condition, but radiation heating means may be provided additionally or alternatively for heating the material under vacuum conditions.

BRIEF DESCRIPTION OF THE DRAWINGS

The invention will be more particularly described with reference to the accompanying diagrammatic drawings, wherein:

FIGS. 6 and 6a illustrate a further embodiment of apparatus according to the invention, FIG. 6 being a vertical sectional view and FIG. 6a being a sectional detail on the line C—C, in FIG. 6, FIG. 9 is a flow diagram for a process according to the invention, and FIG. 10 illustrates a large-scale plant operating the process of FIG. 9.

DESCRIPTION OF THE PREFERRED EMBODIMENTS

Figure 1:
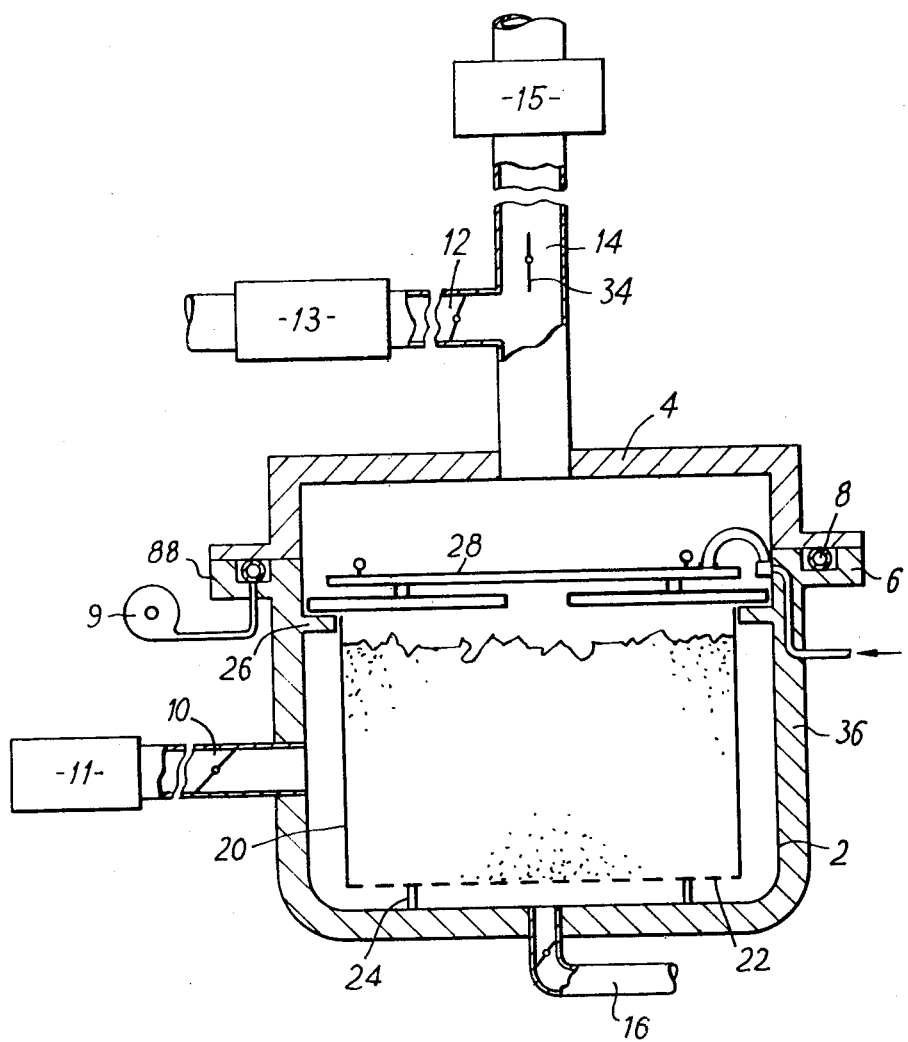
FIGS. 1 to 4 are sectional views of four alternative embodiments of apparatus according to the invention.

Referring to FIG. 1, the apparatus comprises a heating chamber 2 provided with a removable lid 4, top flange 6 of the container carrying a vacuum seal 8 that the lid can seal against, the seal being expandable by an air compressor 9. A series of valve-controlled gas ducts to the chamber interior are provided, namely, a heating gas duct 10, from heating means 11, a waste gas extraction duct 12 to an extraction pumping means 13, a vacuum duct 14 to a vacuum pump 15, and an inlet duct 16 for an anti-oxidation and flushing gas flow. Within the chamber there is a loading basket 20 containing scrap material to be processed, e.g. sheet metal having a lower melting point plating that is to be recovered. The basket has an apertured or permeable base 22 supported clear of the chamber floor by feet 24. Above the basket, resting on interior flange 26 of the chamber, is a water-cooled plate condenser 28 provided with flexible quick-release couplings 30 for the water flow through it.

In use, hot gas is introduced through the duct 10 and circulates around and through the porous base 22 of the loading basket 20 passing up through the scrap material finally exhausting through the extraction duct 12. When the scrap has reached the melting temperature of the metal to be removed, the valves in the gas entry and extraction duct are closed and the vacuum duct 14, previously closed by its valve 34, is put in communication with the chamber. The apparatus is then in the state shown in FIG. 1.

Before the vacuum is applied, the condenser 28 begins to receive its cooling water supply. When the chamber is evacuated the metal to be removed from the scrap material vaporises and passes over the cooled condenser where it condenses and solidifies. After a time dependent on the weight and type of scrap used all the available lower melting point metal will have been captured by the condenser and the vacuum duct valve 34 can then be shut, and the lid 4 can be removed. The water supply couplings 30 of the condenser are then disconnected and the condenser removed allowing the basket of scrap to be lifted out.

In order to minimise heat losses through the chamber wall, in particular when the vacuum is applied, the chamber has a thermally insulated low thermal mass lining 36. The vacuum may be produced by any suitable commercial system, for example a steam ejector system (not shown), possibly coupled with a vacuum pump, able to provide a vacuum that is typically less than $10^{-4}$ torr. It will be understood that it is alternatively possible to use the vacuum duct also to extract the circulating hot gas while the scrap material is being heated.

The flushing duct 16 is provided to admit a bleed flow of hot nitrogen (or other suitable gas) into the chamber during the vapour removal stage, if desired. This is arranged to flush the metallic vapour up and out of the scrap material and over the condenser, and by carefully controlling the nitrogen flow rate the required vacuum conditions can be maintained.

Figure 2:
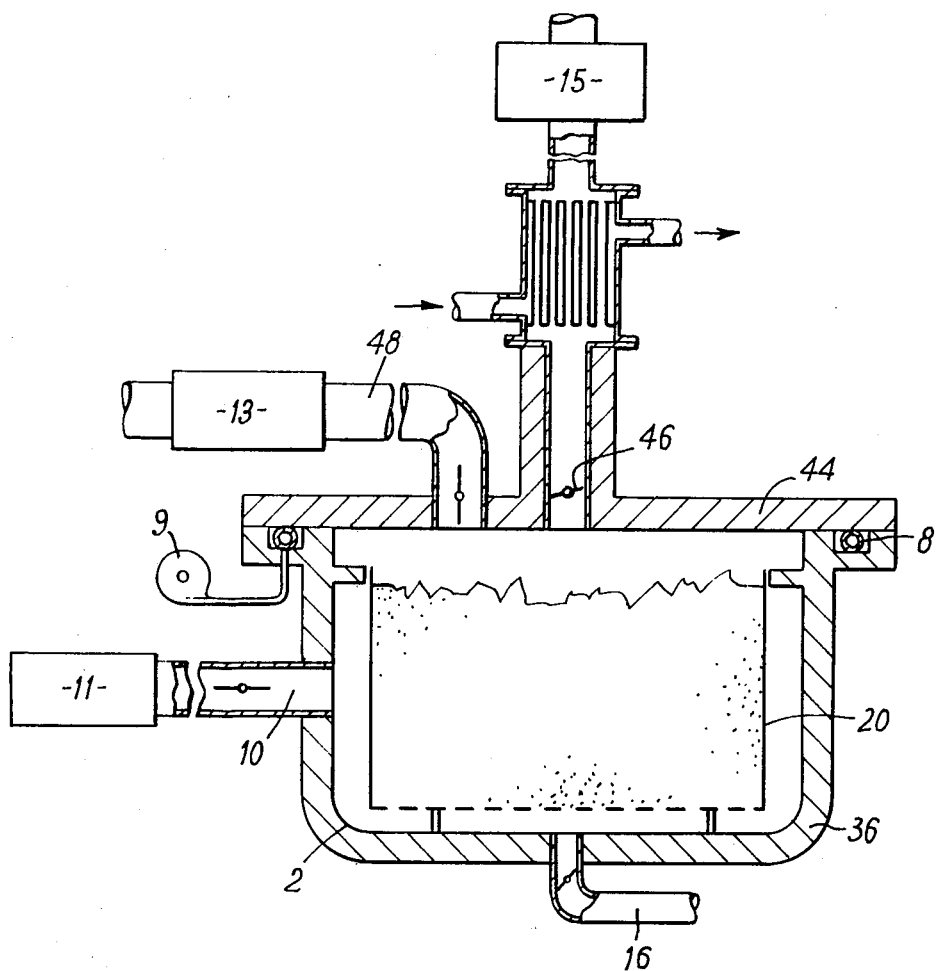

FIG. 2 illustrates a modified apparatus employing a cartridge condenser 42 in place of the plate condenser of FIG. 1. This is mounted on lid 44 of the chamber 2 and the basket 20 is therefore immediately accessible when the lid is removed. Vacuum duct shut-off valve 46 is preferably upstream of the condenser and if a separate extraction duct 48 is provided it preferably bypasses the condenser. In other respects the apparatus is generally similar to that shown in FIG. 1.

Figure 3:
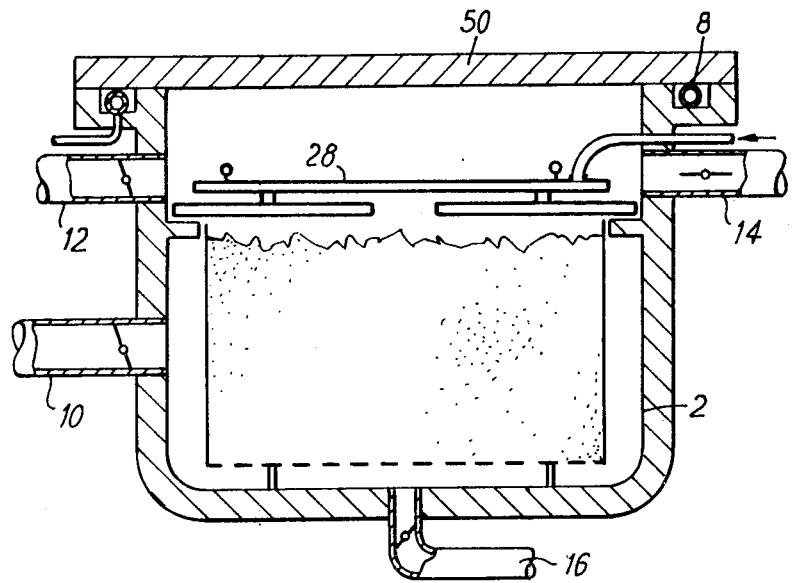
Figure 4:
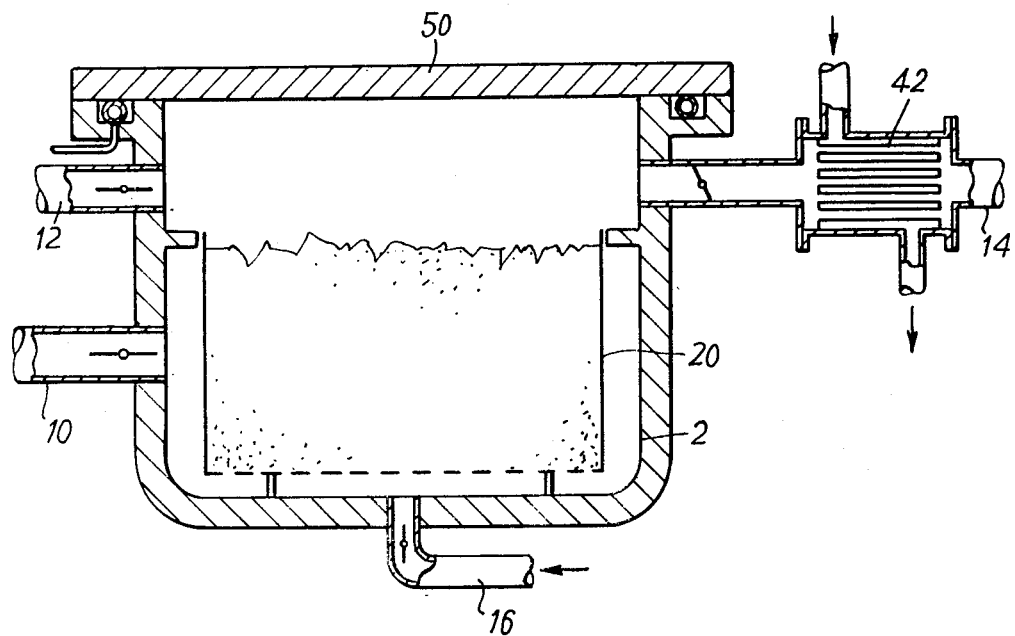

Further modifications are illustrated in FIGS. 3 and 4. These show, for example, how by fitting the ducts in the chamber walls the lid 50 can be removed without disturbing the vacuum and extraction ducts. As in FIG. 2, the alternative condenser arrangement shown in FIG. 4 has the advantage that the basket 20 can be removed directly without having to remove the condenser 42. Using an external condenser as in FIGS. 2 and 4 also permits the condenser to be used more than once before the collected tin has to be removed and larger condensers can be fitted to cater for the processing of a number of charges. This is not possible when using an internal plate condenser because during the heating cycle the metal extracted from a previous charge would melt and could run back onto the new charge of scrap.

Figure 5:
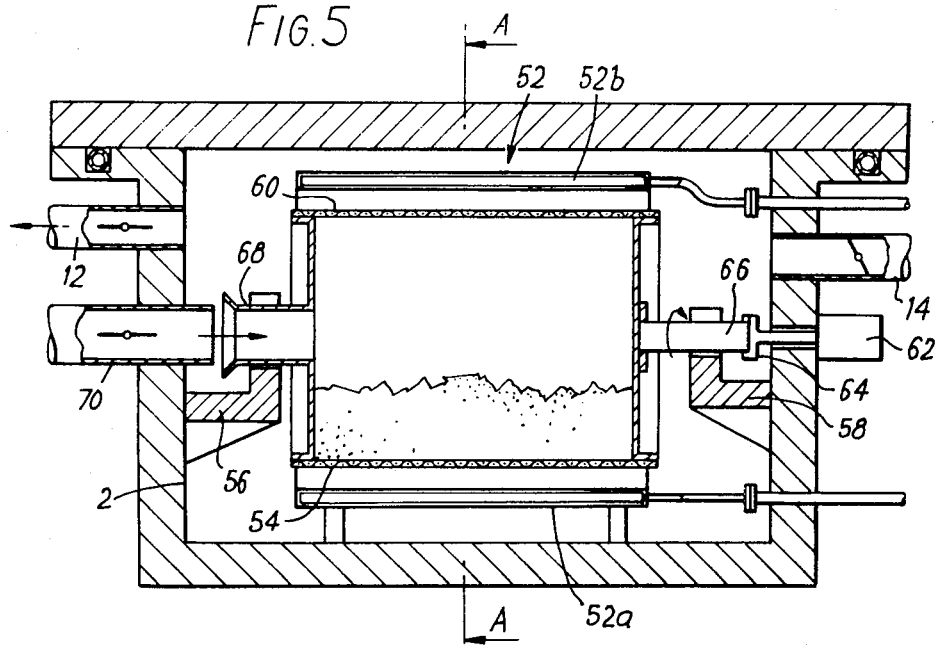
FIGS. 5 and 5a are mutually transverse sectional views on the lines B—B and A—A respectively of another embodiment of apparatus according to the invention.
Figure 5A:
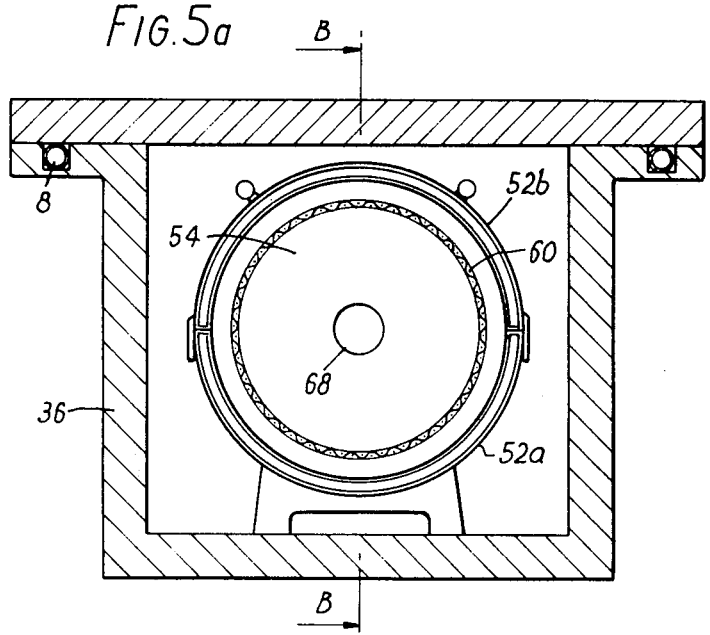
Figure 6:
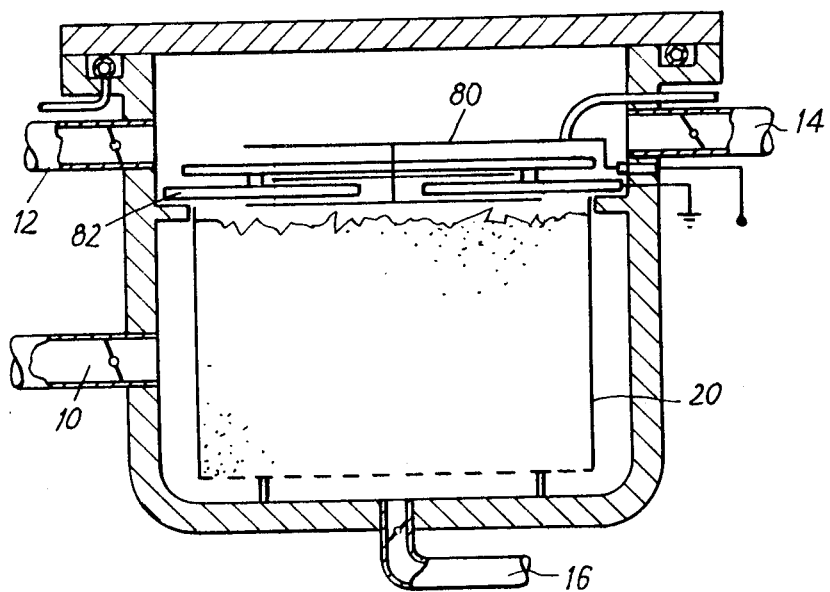

A further variation on the positioning of the condenser is shown in FIGS. 5 and 5a where the condenser 52 is constructed as two separate semi-circular portions forming a tube positioned around the basket of scrap. The basket is in the form of a cylindrical drum 54, supported on a horizontal rotary axis by open-topped trunnions 56, 58, the outer peripheral wall 60 of the drum being porous or perforated for the free passage of gas and vapour. A sealed motor unit 62 outside the chamber has a detachable coupling 64 connecting it to drum shaft 66 to rotate the drum. The coaxial drum shaft 68 at the opposite end of the drum is in the form of a hollow collector for directing the gas flow from the heating duct 70 into the drum from which the gas escapes through the wall 60 after passing through the charge in the drum as this is being tumbled by the rotation of the drum. The split annulus condenser 52 on which the vaporised metal is collected surrounds the drum, the lower half 52a resting on the chamber floor and the upper half 52b being mounted on the lower half. The upper half can be lifted out of the chamber to allow the drum and the lower half of the condenser to be removed.

The tumbling of the charge in the drum assists the flow of metal vapour from the scrap and the annular condenser collects the metal as it leaves the basket. Scrap metals can vary in density from a few pounds per cubic foot to over 30 lb per cubic foot and this arrangement would have advantages for processing a high density scrap where the metal vapour flow could be impeded. Thus in applications involving high density or crumpled scrap feed stock such a configuration with a rotating or otherwise continuously agitated basket may be preferred.

For certain plated materials including tin plate it may be necessary or desirable to heat the material under vacuum, at least as the tin plating is raised above its melting point. This may be required in general if the lower melting point metal or alloy is one that will not vaporise unless heated to temperatures much higher than the melting and alloying temperatures. Such a constituent present as in plating on another metal or alloy substrate if heated at atmospheric temperature may alloy with the substrate, so that regardless of the level of vacuum subsequently applied it will not vaporise. By heating under vacuum it has been found that alloying does not occur to any significant degree and when the material is raised to the vaporising temperature of the plating, the metal or alloy can be completely vaporised.

Figure 7:
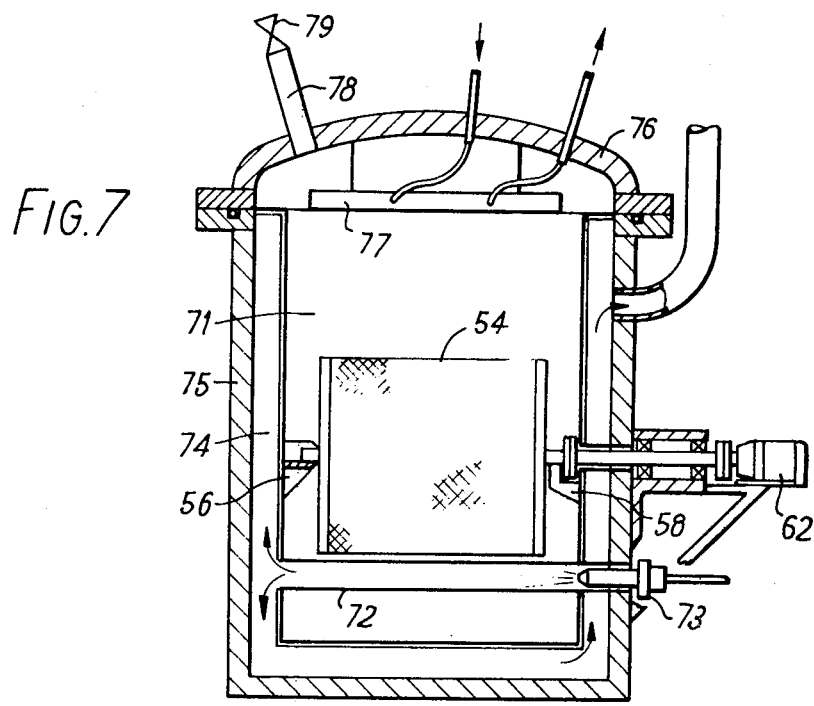
FIG. 7 is a further sectional view illustrating a modification of the apparatus of the preceding figures.
Figure 7A:
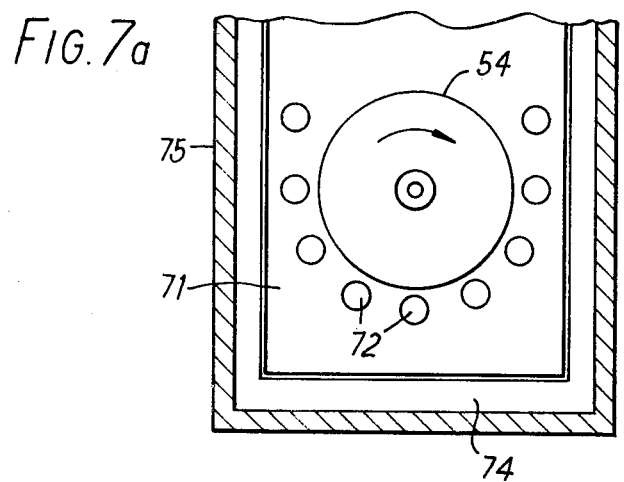

Thus, tin plate scrap may be processed by first being dried at a temperature just below the melting point of the plating metal. This is preferably carried out in a pre-treatment furnace. In practice the drying temperature may not be sufficient to remove any protective paints on the scrap and these, together with the plating metal or alloy can be removed in the next stage of the process in the apparatus which is shown in FIGS. 7 and 7a. Here the scrap is heated under vacuum to vaporise the coating metal and the metal is collected on a cooled collector. The scrap is loaded into the cylindrical drum 54 mounted and driven in the manner already described with reference to FIGS. 5 and 5a. The drum is positioned inside a chamber 71 where arrayed around the bottom and sides of the drum leaving clear access for lifting the drum are a series of radiation muffle heaters 72 which can be heated either by electrical elements or by fuel burners 73 mounted inside them. The exhaust from the burners 73 is circulated through a jacket 74 inside an insulated outer casing 75 of the chamber to ensure that the chamber walls are kept hot to prevent the coating metal condensing on them. A lid 76 seals the chamber and a water-cooled collector plate 77 is mounted under the lid to collect the vaporised metal. The lid is equipped with an outlet duct 78 that can be connected to the means of applying the vacuum and a shut-off valve 79 is in the duct.

The scrap in the drum 54 is heated by heat radiated from the muffled burners after the vessel has been evacuated. To assist heat transfer the basket can be rotated by the sealed motor 62 to tumble the scrap thereby exposing the scrap to more even heating. For tin plate the pressure inside the vessel may be lowered to below $10^{-4}$ torr and preferably to $10^{-6}$ torr. The scrap is then heated to 750° C. or more depending on the pressure used and in this condition the tin will vaporise and sublime and condense on the cooled condenser 77. After a period of time, usually about 10 minutes or more, all the tin will have evaporated. The vacuum is then released and the scrap removed. The tin can then be reclaimed from the condenser as previously described.

The modifications already described can also be made in this apparatus, e.g. the use of an external cartridge-form condenser. However because the scrap is heated under vacuum only those heat input means not requiring a gaseous medium to transfer heat can be used. While the means described above have practical advantages, other means such as electric induction heaters could be used.

Of the forms of condenser shown in the preceding examples, the flat plate condenser of FIGS. 1 and 3 is the simplest construction and can comprise copper or stainless steel (or any other suitable metal) plates positioned close together with their edges sealed to each other to form a thin laminar cavity. The cavity is filled with water or other suitable coolant from a continuously recirculating supply. The coolant flow is controlled to keep the plates cool so that the hot metal vapour will condense on the outer surface of the plates. A plurality of such condensers can be used in multiples as shown to provide a labyrinth path for the vapour to ensure maximum capture.

The annular condenser is similar to the flat plate condenser in principle but is made in two separate halves to allow the scrap basket to be loaded and unloaded while in use the two halves encircle the scrap basket.

The cartridge condenser of FIGS. 2 and 4 comprises a group of tubes for liquid coolant contained in a matrix. This gives a relatively compact design and is therefore more easily handled. An additional advantage is that the duct to the condenser can be shut during heating so as to protect the condenser from excessive heat. However when using an externally mounted cartridge condenser it is necessary to avoid vaporised metal condensing on the walls of the heating chamber before it is led to the condenser. This can be achieved by ensuring that the chamber walls are kept hot by either insulating them to reduce the rate of cooling or by using supplementary external heating. With each design of condenser the metal can be subsequently reclaimed by melting off in a controlled-temperature furnace. Alternatively, it may be possible to scrape the metal off provided the design of condenser allows this.

Metal vapour capture can be further improved by using an electrostatically charged field adjacent to the surface of the condenser. When with the condenser earthed conducting wires are mounted adjacent to the surface of the condenser and an electrical potential of up to approximately 40 kv is applied between them, a corona discharge is formed which charges the metal vapour causing the vapour to migrate to the condenser.

FIG. 7 shows a diagrammatic representation of such an arrangement of discharge wires 80 with a plate type condenser 82 insulated from the wires and earthed. When using a cartridge condenser the wires could pass through the internal matrix.

In the illustrated examples, sealing of the chamber lid must be capable of allowing the vacuum to be maintained in the chamber. In practice this can be achieved by clamping the lid onto the chamber and then expanding the bladder seal 8 (FIG. 1) in the joint by compressed air. The bladder seal would be positioned such that it is not damaged by the heat inside the chamber, e.g. by using the extended flange arrangement 88 shown.

To avoid excess oxidation during heating of the metal to be reclaimed, the heating gases should contain as little free oxygen as possible. This may be achieved by using a closed loop heating gas circuit where the gas is heated from an external source through a heat exchanger.

Figure 8:
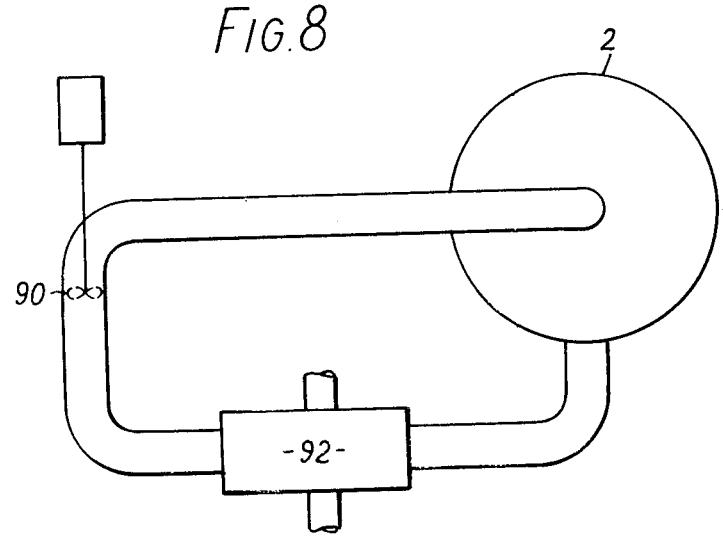
FIG. 8 illustrates a heating arrangement for the detinning chamber in the apparatus of the preceding figures.

FIG. 8 shows such a system in which gas exhausted from the chamber 2 is circulated by a motor-driven fan 90, passing through a heat exchanger 92 where it is heated, for example by an oil or natural gas burner (not shown) before being returned to the chamber.

The process according to the present invention can be operated to remove in a controlled manner organic surface coatings that might otherwise give rise to difficulties, e.g. certain epoxy phenolic or vinyl based lacquers. Whereas the initial pre-heating and drying phase will facilitate the removal of dirt, liquids and some organic materials that are degradable at low temperatures, care should be taken that volatile surface coatings such as paint and some of the known lacquers do not combust. Should such coatings burn on or near the surface of the material being processed, the surface temperature may rise to a level at which the metallic coating on its base metal alloy together and make the subsequent removal of the metallic coating considerably more difficult. This situation may arise, for example in the de-tinning of tinplate so that preferably a drying and cleaning phase carried out at a relatively moderate temperature, e.g. 150°–180° C., and ambient pressure is followed by heating under vacuum in order to break down any volatile surface coatings at an intermediate temperature, e.g. 500°–700° C. at $10^{-4}$ torr. The material being processed is then heated to a higher temperature, at e.g. 800°–900° C. at $10^{-4}$ torr, at which the vaporisation of the metallic coating takes place rapidly. The sequence of processing shown in FIG. 9 may be followed for example.

The precise temperatures employed in the process may be considerably different in different instances and will depend upon such factors as the particular metal pairs to be separated, the organic coatings other foreign material that may be present, and the levels of vacuum used.

The use of the process outlined in FIG. 10 which shows schematically a layout for a large tonnage plant. In this, scrap is transferred by conveyor 101 to a loading hopper 102 and fed into a drying kiln 103 equipped with fume extraction means 104 and fed with a supply of oxygen-free gas to prevent any combustion. Here the scrap is dried and not only water but also fats removed by the controlled-temperature gas flow, which may be a once-through flow or a closed loop recirculating flow. The scrap after drying passes along a conveyor or vibrating feeder 105 where it is partially cooled and retained foreign matter is loosened. The scrap is then picked up by an overhead magnetic separator 107 and any dirt is deposited into a skip 106.

The cleaned scrap is elevated by conveyor 108 to a storage hopper 109 from which it is discharged by conveyor 110 to a scrap basket 111. The basket is moved by rail to an unloading point and is transferred by overhead crane 112 to one or more vacuum de-tinning chambers. In most cases three chambers 113, 114 or 115 will be adequate. The scrap is then de-tinned as already described and the de-tinned scrap transferred by crane 112 to a flat rail car 116. The basket and rail car are then transferred to an unloading point and the scrap discharged by crane or tipping into a baling press 117. The empty basket is then transferred to the loading point and the baled scrap is loaded into rail cars for delivery to the customer. The tin-coated condensers from the chambers 113, 114, 115 are transferred to a small furnace 118 for the tin to be removed. A plant of this form could process in the region of 15 tonnes of scrap per hour: however, plants with outputs as low as 2 tonnes per hour can be economically operated.

Among the advantages of the process described above, the following may be noted:

(1) Efficiency of removal is largely independent of the form of tin plate scrap i.e. both press trimmings and reclaimed tin cans can be processed efficiently.

(2) The problems of lacquer removal are overcome without the difficulties associated with conventional lacquer removal processes.

(3) The locked seams and joints in used tin cans do not impede tin removal.

(4) Aluminium can ends, which can be a severe problem in chemical de-tinning, are no longer a problem with this process.

(5) The process is cheaper to operate per tonne than conventional chemical processes.

(6) The size of plant would be small for a given throughput. Plants could therefore be built at can reclamation centres, centralised depots or steelworks, thereby simplifying the transport and collection arrangements for used cans and other forms of tin plate scrap.

(7) The process can be carried out without causing pollution and can reduce the amount of energy required per tonne of material processed.

It should be noted that when processing scrap tin cans they will contain lead in the solder used in the can seams. The lead vaporises at a different temperature from tin and so the two metals can be vaporised and collected sequentially. However in practice both may be collected together to simplify operation. The resultant lead/tin alloy can subsequently be refined by controlled vacuum deposition to provide separate deposits of tin and lead of commercial purity.

While the foregoing description has referred to the recovery of tin from tin plate, the process according to the invention has wider application to the recovery of lower melting point metals and alloys in general from scrap and refuse, e.g. zinc or, as already mentioned, lead and copper.

The manner in which the heating is applied and the pressure conditions provided can be chosen to suit the particular materials being treated. In the example of tin recovery from tin plate already referred to, consideration must be given to the likelihood that the tin plating may alloy with the steel base if suitable control is not exercised as heating progresses. In such a case, heating under vacuum may allow the lower melting-point constituent to vaporise at a sufficiently low temperature to avoid the possibility of alloying, but as already mentioned there are practical difficulties in transmitting the heat economically to the material. It is therefore preferred to heat the material initially in a controlled atmosphere, so that conductive and convective heat transfer can also occur, but only to a temperature below the melting point of the lower melting point constituent. When the temperature is reached, the pressure is sharply reduced and said constituent passes almost immediately to its vapour phase, before it has any opportunity to alloy with the higher melting-point constituent and can then be collected as described.

For other materials modifications of this procedure may be preferred on the grounds of efficiency or economy. Some materials may not be susceptible to alloying problems, for example, and the heating to vaporising temperature can be carried out in a suitably inert atmosphere throughout. If it is necessary to apply a vacuum, or at least to reduce pressure, during the process, in some instances the pressure drop may be effected only when the heat input has been completed or it may be desirable to reduce the pressure at an intermediate stage before the maximum temperature has been reached. In either case, it may be required to apply the vacuum or reduce pressure before melting, as in the example of tin given above, or after melting, if this will not result in problems, e.g. alloying of the material to be separated.

What is claimed is:

1. A process for removing tin from scrap or waste tin plate comprising the steps of initially subjecting the tin plate to a first low temperature heating stage in a current of gas to remove moisture present, thereafter heating the tin plate under vacuum to a second and higher temperature heating stage above the melting point of the tin but below the melting point of the steel base of the tin plate for vaporisation of the tin, and thereafter recovering the vaporised metal by condensation on a cooled surface for collection.

2. A process according to claim 1 wherein the pressure is reduced to less than $10^{-4}$ torr.

3. A process according to claim 1 wherein the pressure for said final stage is reduced at least to $10^{-6}$ torr.

4. A process according to claim 1 wherein an electrostatic field is produced in the region of the collecting surface or surfaces for assisting the deposition of the vaporised metal thereon.

5. A process for recovering tin from tin plate by the application of heat while preventing oxidation of the tin coating, comprising the steps of initially drying the tin plate under ambient pressure by heating to a low temperature level not substantially greater than 180° C.; thereafter heating the dried tin plate to an intermediate temperature level between said low temperature and the temperature at the tin would melt, to break down non-metallic impurities present while simultaneously maintaining a vacuum about said tin plate sufficient to remove the vapour released thereby; subsequently increasing the temperature of said tin plate to a higher level above the melting point of the tin but below the melting point of the steel base of the tin plate while simultaneously maintaining a vacuum of at least $10^{-4}$ torr on said tin plate for a time sufficient to vaporize the tin and collecting the vaporized tin by deposition on at least one collecting surface.

6. A process according to claim 5, wherein heating at said relatively low temperature level is within the range of from 150°–180° C., heating to said intermediate temperature level is within the range of from 500°–700° C., and heating above the melting point of the tin is within the range of from 800°–900° C.

7. A process according to claim 6 wherein the tin plate is agitated while being heated.

8. A process according to claim 6 wherein the tin plate is in the form of scrap tin cans having lead-containing soldered seams and the lead and tin are vaporised sequentially at different temperatures.

* * * * *